(12) United States Patent
Edvardsson

(10) Patent No.: US 7,173,436 B2
(45) Date of Patent: Feb. 6, 2007

(54) ANTENNA DEVICE FOR LEVEL GAUGING

(75) Inventor: Olov Edvardsson, Linköping (SE)

(73) Assignee: SAAB Rosemount Tank Radar AG, Gothenburg (SE)

( * ) Notice: Subject to any disclaimer, the term of this patent is extended or adjusted under 35 U.S.C. 154(b) by 0 days.

(21) Appl. No.: 10/997,683

(22) Filed: Nov. 24, 2004

(65) Prior Publication Data

US 2006/0109010 A1     May 25, 2006

(51) Int. Cl.
*G01R 27/04* (2006.01)
*G01S 13/08* (2006.01)

(52) U.S. Cl. ........................ 324/644; 342/124
(58) Field of Classification Search ............... 324/644; 342/375, 124, 175; 73/290 R
See application file for complete search history.

(56) References Cited

U.S. PATENT DOCUMENTS

| | | | | |
|---|---|---|---|---|
| 5,115,218 A | | 5/1992 | Jean | 333/252 |
| 5,594,449 A | * | 1/1997 | Otto | 342/124 |
| 5,923,291 A | * | 7/1999 | Page | 342/375 |
| 6,266,022 B1 | | 7/2001 | Muller et al. | 343/703 |
| 6,275,192 B1 | * | 8/2001 | Kim | 343/700 MS |
| 6,320,532 B1 | | 11/2001 | Diede | 342/124 |
| 6,325,391 B1 | | 12/2001 | Smith et al. | 277/650 |
| 6,353,443 B1 | * | 3/2002 | Ying | 715/702 |
| 6,433,737 B2 | * | 8/2002 | Katz | 342/367 |
| 6,629,458 B1 | | 10/2003 | Westerling et al. | 73/290 |
| 6,684,697 B1 | | 2/2004 | Westerling et al. | 73/290 |
| 6,919,862 B2 | * | 7/2005 | Hacker et al. | 343/909 |
| 6,950,055 B2 | * | 9/2005 | Edvardsson et al. | 342/124 |
| 2002/0059828 A1 | * | 5/2002 | Muller et al. | 73/290 R |

FOREIGN PATENT DOCUMENTS

| | | |
|---|---|---|
| EP | 0762089 A2 | 3/1997 |
| JP | 10-197617 | 7/1998 |

OTHER PUBLICATIONS

"International Search Report" for PCT/SE2005/001752.

* cited by examiner

*Primary Examiner*—Andrew H. Hirshfeld
*Assistant Examiner*—John Zhu
(74) *Attorney, Agent, or Firm*—Westman, Champlin & Kelly, P.A.

(57) ABSTRACT

An antenna device for determining the filling level of a filling material in a container (tank) comprising an essentially flat array antenna with an emitting area for emitting measuring signals towards the surface of the filling material and a holder for holding the array antenna over an opening of the container and to be connected to the rim of the opening in at least two points of attachment. Further, a protective dielectric cover covers the emitting area, the dielectric cover having an extension larger than the opening in order to extend over the rim of the opening. The antenna device provides several advantages, such as a very efficient sealing of the container opening, a very clean solution towards the container and a very effective protection of the array antenna.

21 Claims, 3 Drawing Sheets

ANTENNA DEVICE FOR LEVEL GAUGING

FIELD OF THE INVENTION

The present invention relates to an antenna device with an essentially flat array antenna for determining the filling level of a filling material in a container. In particular, the invention is useful in applications where resistance against contaminations are of special importance, such as in micobiological applications, and in applications where it is of importance to avoid extension of the antenna device into the container interior.

BACKGROUND OF THE INVENTION

Electromagnetic microwaves, such as radar, could be used to determine filling levels in containers, and this method is since several years the dominating method for level gauging in containers tanks. The antenna is a critical part of such systems, and different types of antennas has been proposed and used, depending on e.g. the type of application, the filling material, the environmental conditions, the required measuring accuracy, etc.

One type of antenna that is widely used, and in many cases advantageous, is the flat array antenna An array antenna can e.g. create a narrow antenna beam without decreasing the measuring range by its vertical extension, which would be the case when using for instance a rod antenna, which is a common alternative for similar purposes. The antenna could be made with printed circuit board technique, and provides a flexible design capable of creating a variety of antenna functions. This makes it well suited for level gauging. This type of antenna could either be arranged inside the container, on a holding structure which extends into the container, or be arranged in level with the container wall, over an opening of the container. However, both said arrangement methods have severe problems in certain applications.

In U.S. Pat. No. 6,266,022 a flat array antenna mounted on a holding structure which extends into the container. When arranged on a holding structure entirely inside the container, it is difficult to achieve a tight sealing through the container wall, leading to severe leakage problems. Further, this arrangement requires free space in the top of the container, which is not always obtainable.

The arrangement of the antenna device directly in an opening of the container is also the subject of various problems. For example, it is difficult to achieve a tight sealing of the container opening. In fact, several separate leakage problems occurs simultaneously: leakage into the antenna device, which would affect the antenna functionality; leakage through the emitting surface of the antenna, which would affect and deteriorate the antenna electronics; and finally, leakage through the antenna device to the exterior.

Further, the temperature difference which normally prevails between the exterior and the interior of the container gives rise to condensation on the emitting surface of the antenna, which deteriorates the measuring performance of the antenna device. Another common problem in this type of arrangement is to obtain an adequate ability to withstand the high pressures which are often involved in this type of containers. Normal pressures could be in the range 16–40 bar.

A general problem affecting all flat array antenna devices is the problem of contaminations. For many applications the risk of contamination is a big issue. For level gauging in tanks used in e.g. food and pharmaceutical industry there is a mandatory need for internal surfaces which can be very efficiently cleaned. For example, even a few μm particles can easily hide bacteria capable of closing down a whole dairy for a few days. It can be noted that even a single or a few tenths of a mm of wet dirt can obstruct the function severely and that many times the combination of dirt and condensation, which is attracted by the dirt, is the worst case.

Another common requirement for antenna devices used for level gauging is to withstand a wide range of chemicals. This requirement is normally difficult to fulfill without using expensive materials, such as hastelloy, and the like.

Further, all prior art array antennas are inherently sensitive for leakage and corrosion as compared to horn antennas etc, since a packet of circuit boards is much more difficult to seal efficiently than to plug a circular waveguide (pipe).

It is therefore a need for a more effective flat array antenna, especially for mounting in a container wall opening, for use in level gauging.

SUMMARY OF THE INVENTION

It is therefore an object of the present invention to provide an antenna device with an essentially flat array antenna for determining the filling level of a filling material in a container, which at least partly alleviates the above-discussed problems of the prior art.

This object is achieved with an antenna device as defined in the appended claims.

According to the invention, an antenna device for a radar level gauging system for determining the filling level of a filling material in a container is provided, comprising:

an essentially flat array antenna with an emitting area for emitting measuring signals towards the surface of the filling material;

means for holding the array antenna over an opening of the container and to be connected to the rim of said opening in at least two points of attachment; and a protective dielectric cover covering said emitting area, wherein said dielectric cover has an extension larger than said opening in order to extend over the rim of said opening, and preferably also past said points of attachment.

This antenna device employs a new way to adopt the per se well known array antenna to the strict requirements of a clean tank inside and also to adopt the antenna function to this environment including a way to reduce the influence of condensation.

The enlarged protective dielectric cover has proven remarkably efficient to avoid contaminations and the build up of bacteria and the like on the antenna device. When the antenna device is mounted over a container opening, the dielectric cover is placed between the container wall and the rest of the antenna device, i.e. the array antenna and at least part of the holding means. The dielectric cover, which could e.g. be made of polytetrafluoroethylene (PTFE), polyphenylene sulfides (PPS), polyether ether ketones (PEEK) or similar materials, and preferably of a homogeneous material, provides a clean surface which is the only part of the antenna device that is exposed to the container interior. Hereby, the exposed parts of the antenna device could be made with very smooth surfaces and with no material joints, which makes it extremely resistant to contamination. Further, this dielectric cover provides an efficient and relatively inexpensive protection against a wide range of chemicals.

The antenna device is adapted to be mounted over an opening of the container and to be connected to the rim of said opening in at least two points of attachment. E.g. the antenna device could be integrated in a flange cover, i.e. mounted on the lower side of a standard flange. Hereby, said dielectric cover also provides a very efficient sealing of the container opening. Accordingly, the dielectric cover solves the problem of leakage of the container, and also protects the array antenna from contamination and corrosion. Accordingly, effective measures against several separate leakage problems are hereby simultaneously provided: with the new antenna device leakage into the antenna device, which would affect the antenna functionality, is avoided; leakage through the emitting surface of the antenna, which would affect and deteriorate the antenna electronics, is avoided; and finally, leakage through the antenna device to the exterior is avoided.

Still further, the protective dielectric cover extending outside of the opening of the container makes the antenna device well suited to withstand a high pressure by e.g. adding a stiff metal-backing.

In a preferred embodiment, the protective dielectric cover has a mean thickness of essentially a fourth of the wavelength ($\lambda/4$), in the dielectric cover material, of the signals emitted from the array antenna. If signals of different frequencies are used, the wavelength measure relates to the center frequency of said frequency range.

The use of such a thin dielectric window gives the effect of a good impedance match, especially when the array antenna and the dielectric cover are close together, which is also good for the mechanical stability especially to withstand an internal tank pressure. The most typical frequency is just below 6 GHz, as the common occurrence of foam and coatings will make higher frequencies unsuitable, and then a quarter-wave window of PTFE will be 9 mm thick which from mechanical viewpoint is a reasonable thickness for an antenna with a typical diameter of 100–150 mm.

In a preferred embodiment, the antenna device is adapted to be mounted in a non-horizontal position, but wherein the array antenna is controllable to provide a maximum radiation direction which is essentially vertical. This could e.g. be achieved with an array antenna comprising a printed circuit board (PCB) with a metallic layer with radiating slots on the side towards the cover and a power distributing network on the other side including phase differences to create an antenna lobe allowing a vertical radiation. Hereby, the problem of condensation droplets building up on the emitting surface of the antenna device is alleviated. The surface could be arranged with many different inclination angles in relation to a horizontal plane, but an inclination of about 10 degrees has been found to be sufficient to solve the above-discussed problem.

Further, As an alternative or additional measure to avoid condensation on the emitting surface of the antenna device, the surface arranged to face the interior of the container could be at least locally inclined in relation to the essentially flat array antenna. In one embodiment, the surface arranged to face the interior of the container comprises a plurality of areas with different inclination. However, other geometries are possible as well.

In both alternatives, the inclined surface(s) could be arranged with many different inclination angles in relation to a horizontal plane, but an inclination of about 10 degrees has been found to be sufficient to solve the above-discussed problem.

While the non-horizontal, essentially flat surface with vertical antenna lobe is the simplest implementation, it has a disadvantage in that hardware for several different inclinations are necessary, escpecially if the inclination is not known in advance. A possibility to make a choice of inclination during installation would solve this. This could be achieved by means of anarray antenna that includes a second PCB with provisions for changing the phase difference by differencing the pattern on the second PCB in relation to the first PCB. Hereby, the direction of the lobe could easily be changed during installation without exchanging the delivered hardware, which makes the antenna device very flexible and easy to adapt for various applications.

The pattern is preferably arranged to give two polarizations to separate the transmitter and receiver antenna functions.

In a preferred embodiment, the protective dielectric cover is integrated with the array antenna. Hereby, a very clean antenna device is obtained, since no enclosed air space is left between the array antenna and the dielectric cover. Further, the pressure stability of the device is hereby improved.

It is further preferred that the means for holding the array antenna comprises a support arranged on the backside of the array antenna for improving the pressure resistance. E.g. the support for holding the array antenna could comprise a plate-like member of a rigid material. Hereby, a relatively simple but highly efficient antenna device is provided, with an ability to withstand higher pressures.

These and other aspects of the invention will be apparent from and elicited with reference to the embodiments described hereinafter.

BRIEF DESCRIPTION OF THE DRAWINGS

For exemplifying purposes, the invention will be described in closer detail in the following with reference to embodiments thereof illustrated in the attached drawings, wherein.

DESCRIPTION OF PREFERRED EMBODIMENTS

Figure 1:
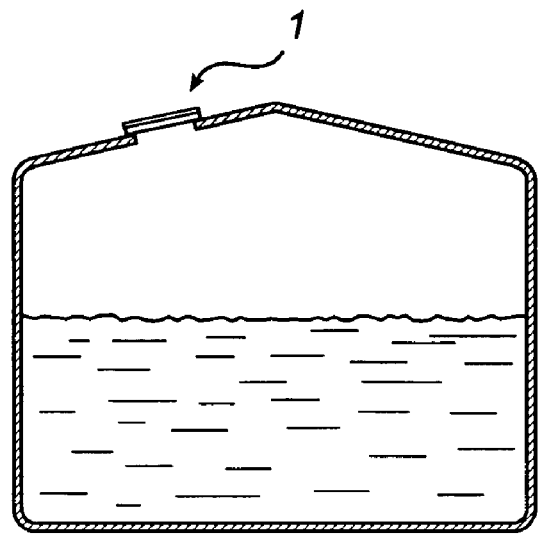
FIG. 1 is a schematic cross-sectional side view of a container, in which an antenna device according to the embodiment is arranged.

In FIG. 1 it is illustrated a schematic container, such as a tank, for housing of a liquid or the like. In the roof part, an antenna device 1 for level gauging is arranged. The details of different embodiments of such an antenna device will be discussed in more detail in the following.

Figure 2:
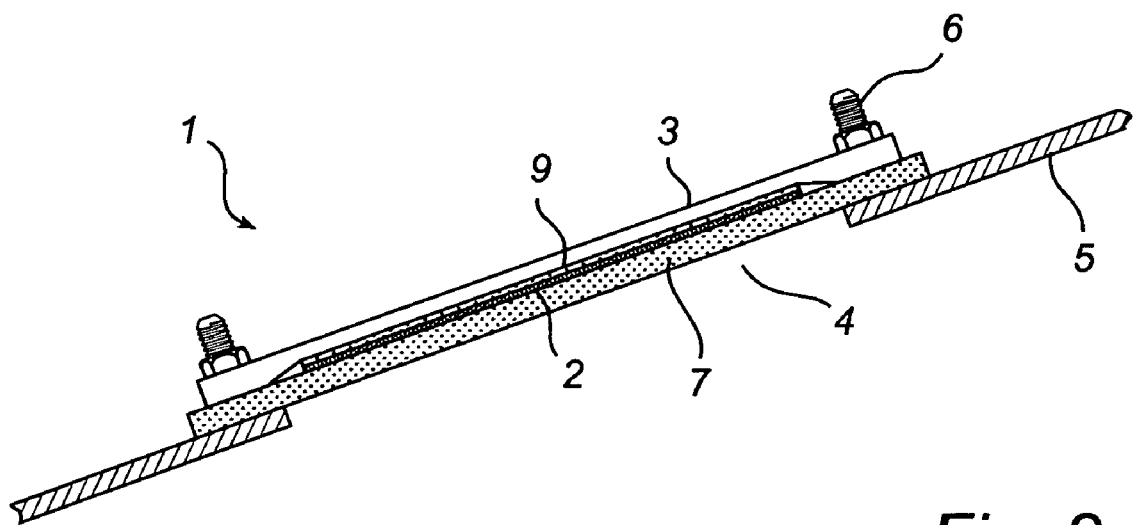
FIG. 2 is a schematic cross-sectional side view of an antenna device according to a first embodiment of the invention.
Figure 3:
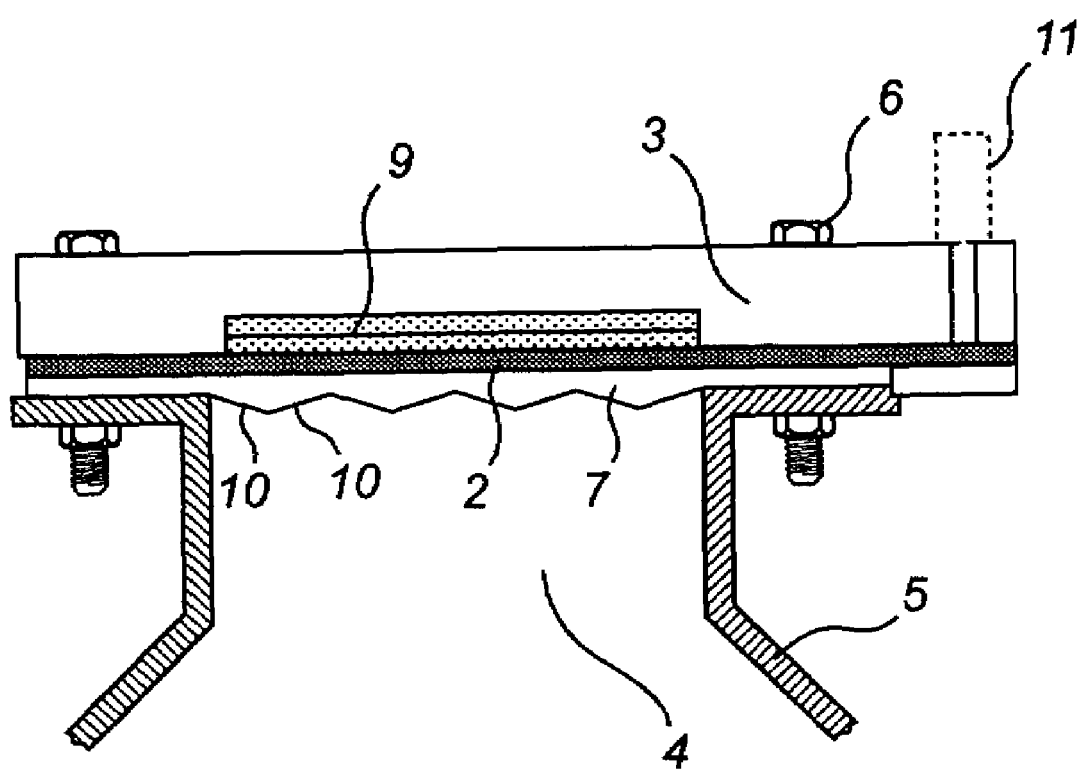
FIG. 3 is a schematic cross-sectional side view of an antenna device according to a second embodiment of the invention.

With reference to FIGS. 2 and 3, antenna devices 1 according to a first and second embodiment for determining the filling level of a filling material in a container are illustrated. The antenna devices comprises an essentially flat array antenna 2 with an emitting area for emitting measuring signals towards the surface of the filling material. The structure and functionality of the antenna devices of the first and second embodiment are essentially the same, except for the differing parts explicitly discussed in the following.

On the other, non-emitting side of the array antenna, a support 3 is arranged for holding the array antenna over an opening 4 of the container 5 and to be connected to the rim of said opening in at least two points of attachment 6. The support 3 is preferably a plate-like member of a rigid material, such as steel, and with good pressure resisting properties. At the points of attachment 6, the antenna device may be connected to the container wall by means of fasteners, as is per se known in the art. For example, the antenna device may be fastened by means of attachment bolts. Preferably, a plurality of attachment points are used, and preferably equidistantly distributed around the peripheral part of the antenna device.

The array antenna is preferably arranged to emit microwaves for radar level gauging, and could be used together with conventional radar level gauging equipment. The array antenna preferably includes a plurality of radiating elements (patches, slots, etc) and some kind of printed wiring for feeding and power distribution. One or a few circuit boards can be needed depending on the use. Such equipment is per se well known in the art, and will not be discussed further in this application.

Closest to the opening 4 of the container 5, a protective dielectric cover 7 is provided. The dielectric cover 7 is arranged to cover the emitting area of the array antenna 2 from the interior of the container, and is preferably integrated with it. When the antenna device is mounted over an opening of the container, the dielectric cover is placed between the container wall and the rest of the antenna device, i.e. the array antenna and at least part of the holding means. Further, the dielectric cover is large enough to extend past the opening in the container wall, and past said points of attachment 6. Hereby, the only contact between the antenna device and the container wall is through said dielectric cover.

The dielectric cover serves both as a protection for the array antenna and as a sealing between the container and the antenna device. If a leakage from the tank should occur there is no leakage into the antenna circuits. Preferably, the dielectric cover is an essentially flat plate. The enlarged extension of the plate provides a frame utilized for the sealing. The frame can be pressed towards the container wall, e.g. a hole in its roof, by for instance a metallic frame. The container roof is typically conical and the dielectric frame may be mechanically matched, e.g. by milling of by special shaping, to a conical shape. Due to the typically limited size of the window, 100–150 mm can normally be assumed, such a shape matching is rather small, typically 1–3 mm arch height, and even a bending during mounting may be considered. However, naturally the dielectric cover can be designed to fit a standard flange as well, or other type of container openings.

The dielectric cover is preferably integrated with the array antenna, i.e. said components are arranged in direct contact with each other. By the absence of air between the array antenna and the dielectric cover it is possible to get a good support on the cover to withstand pressure.

The feeding is not shown in FIG. 2, but is per se well known, and could be realized by any method known in the art. A coaxial connector can for instance penetrate the metal backing 3 and be coinnected to the pattern. This connector does not need to support any pressure. A waveguide perpendicular to 3 can be used for the same purpose and also enable a second transmission way (transmit/receive, dual polarization etc). The radial connection indicated in FIG. 3 can also be used.

The dielectric cover could be made of e.g. polytetrafluoroethylene (PTFE), but many other dielectric materials are feasible as well. Preferably, the dielectric cover is made of a homogeneous material. However, provision of different materials in different sections of the cover, e.g. in the part to be placed over the opening and the part to be placed over the opening frame, are also feasible for certain applications.

The dielectric cover is preferably relatively thin. Specifically, a mean thickness of essentially a fourth of the wavelength, λ/4, of the signals emitted from the array antenna could be used. The most typical frequency is just below 6 GHz, since the common occurrence of foam and coatings will make higher frequencies unsuitable, and then a quarter-wave window of PTFE will be 9 mm thick which from mechanical viewpoint is a reasonable thickness for an antenna with a typical diameter of 100–150 mm. The quarter wavelength thickness is useful to facilitate the microwave match of the antenna, but many other techniques for obtaining good antenna matching are also feasible, for the provision of thinner covering layers etc.

In order to alleviate problems such as condensation on the emitting surface, it is preferred to arrange the surface of the antenna device facing the interior of the container to be in a non-horizontal disposition. This could basically be achieved in two different ways: by arranging the antenna device in an inclined, i.e. non-horizontal disposition, or by providing the dielectric cover with a geometry that provides at least locally inclined areas in relation to essentially flat array antenna. Different combinations of these solutions are also possible. A mounting directly on the tank roof is normally a preferred solution in order to avoid hidden spaces for contamination, but in many applications a mounting on a horizontal or non-horizontal flange is more common.

When the antenna device is mounted in an non-horizontal position, it is preferably mounted over a non-horizontal opening in the container wall. Such an arrangement is schematically illustrated in FIG. 1. In such an arrangement, it is still preferred to have an essentially vertical direction of the emitted antenna lobe. The provision of an antenna lobe in a non-perpendicular direction in relation to the emitting surface could be achieved in various ways. The non-perpendicular antenna lobe direction could be arranged fixedly in an angular direction chosen to suit an intended non-horizontal mounting in a tank. However, the angular direction of the lobe may also be controllable. In that case, the angular direction of the lobe may be adjusted for each mounting position, and accordingly, one and the same antenna device may be mounted in many different non-horizontal positions, and in many different tanks and containers.

The inclination angle could be chosen based on the application in questions, the environmental conditions at hand, etc, and the principle as discussed is adoptable to a range of mounting angles. For instance an inclination of 5, 15, 25 and 35 degrees may be a practical range of inclinations each covering a ±5° around said angles.

As an alternative, or complement, the dielectric cover may have a geometry providing the surface arranged to face the interior of the container with at least one, and preferably a plurality of areas with different inclination. Such an embodiment is illustrated in FIG. 3. In this embodiment, the antenna device is mounted in an essentially horizontal position, and the dielectric cover is provided with a flat top surface facing the array antenna and a plurality of locally inclined areas 10 facing the interior of the container in the bottom surface. The antenna device of this embodiment could be used for higher pressures, since it could be mounted on conventional, typically horizontal flanges. The feeding in FIG. 3 can be realized in the same way as discussed earlier, however, in FIG. 3 the feeding is made by letting one of the PCBs be extended through the flange to be connected to the connector 11.

To get the inclination to avoid unfavorable accumulation of condensation the lower surface of the PTFE window could e.g. be shaped with a pattern of small "pyramides" directed downwards. Each pyramid is preferably of the same size as the periodicity of the radiation pattern and thus the electrical function, at dry surface, can be the same as for a flat surface with a suitable chosen height of said pyramides.

The array antenna could comprise an antenna pattern typically made on a PCB-like structure with a copper plane with patches or slots pressed or glued against the dielectric cover. Further, the pattern is preferably fitted with a distribution pattern on the back side.

The distribution pattern could preferably include impedance matching and provisions for a phase change, e.g. by means of different line lengths, to obtain an essentially vertical antenna lobe in spite of a possible non-horizontal mounting on a container roof.

The pattern could be adapted for a certain range of roof inclination. However, by making a part of the delay lines on an upper circuit board 9, a change in the upper board or its mounting could be used to adjust the direction if needed. Hereby, the direction of the emitted main lobe becomes controllable. For example, the array with a distribution pattern on the first PCB can be adopted for different angles by a quadratic second PCB 9 which has a pattern interacting with said first pattern in four different ways depending on the mounting (turning) of the quadratic second PCB. Once mounted the PCBs could be sealed.

Figure 4:
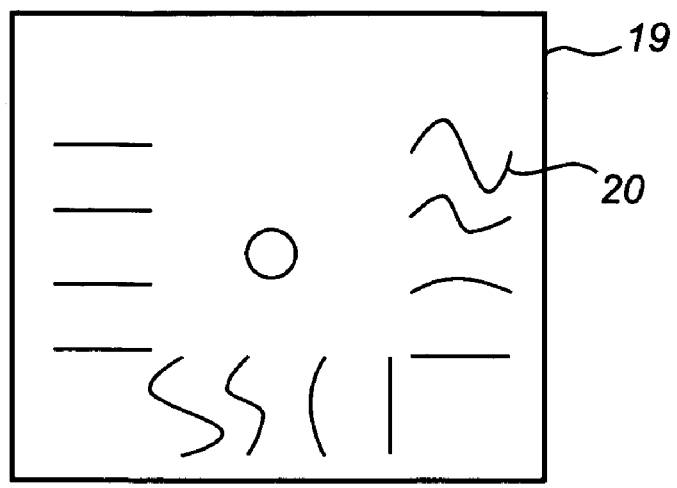
FIG. 4 is an example of a feeding network for the array antenna allowing the direction of the beam to be changed.
Figure 4:
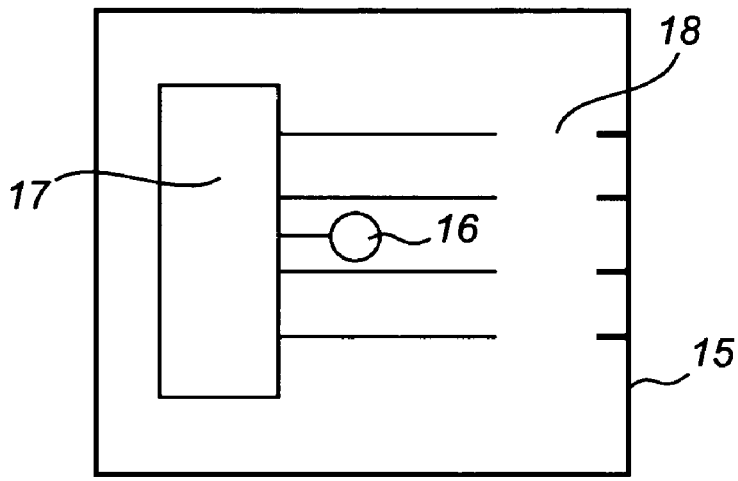
Figure 4:
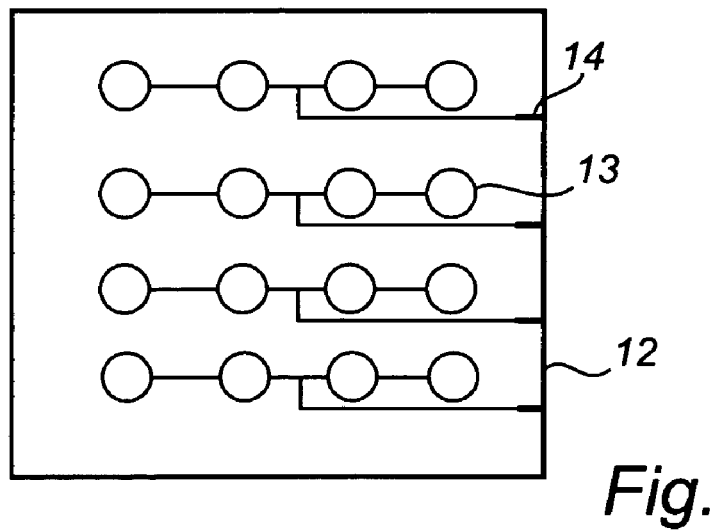

FIG. 4 shows one possible arrangement to implement this. On the lowest part 12 of FIG. 4 there are 4 rows each with 4 circles 13 each representing an antenna element or a small group of elements fed together. The rows are horizontal (also in the real mounting) and fed by a common line from 4 common points 14. The middle part 15 contains a common connection point 16 (to a coaxial connector etc. connected through a hole in the highest part 19), a power distribution network 17 and lines finally meeting the connectors 14 on the lowest part 12, The lines going between 17 and 14 have a gap 18 in each line. On the highest part 19 in FIG. 4 there are patterns 20 connecting the gaps 18. The connection s over the gaps may have different length giving an inclination of the antenna lobe by adjusting the phase for the different horizontal rows of antenna elements. Furthermore the highest part 19 is made quadratic and possible to place in 4 positions, each position having different delay lines 20. This circuit board 19 is turned at the installation to a suitable position depending on the desired lobe direction. If desired, the circuit board can have different patterns on its two sides giving 8 possible patterns and lobe directions. Not only lobe direction but also polarization and other characteristics can be changed by this method. The connection from 20 to the gaps 19 may be galvanic but may preferably be made by quarter-wave lines with thin insulation to be less sensitive for unreliable connection when the circuit boards are pressed together during field installation.

The thickness of the dielectric cover do not need to be exactly the same over the whole surface but a uniform thickness is a practical choice, since the dielectric covering will need to be slightly different in different cases while a very limited choice of PCBs is practical (such as 100×00 mm with 4×4 slots or 150×150 mm with 6×6 slots; in both cases with the number of slots adopted for use close to 6 GHz).

The array antenna can be adapted for use with only one antenna function, i.e. the same antenna components are used as transmitter and receiver. However, the array antenna may also be adapted to separate the receiver and transmitter antenna functionality. For example, it is possible to use separate polarizations for transmission and reception (vert/hor or RHCP/LHCP) to separate the transmitter and receiver functionality. Further, most known methods from the art of printed array antennas can be used.

Further, the array antenna need not necessarily use a printed circuit board, but other types of metallic patterns could be used as well.

Specific embodiments of the invention have now been described. However, several alternatives are possible, as would be apparent for someone skilled in the art. For example, many different materials may be used for the different components of the antenna device, different type of array antennas may be used, different ways of connecting the antenna device to the container may be employed, etc. Such and other obvious modifications must be considered to be within the scope of the present invention, as it is defined by the appended claims.

What is claimed is:

1. An antenna device for use in a radar level gauging system for determining the filling level of a filling material in a container, comprising:

an essentially flat array antenna with an emitting areas for emitting measuring signals towards the surface of the filling material;

means for holding the array antenna over an opening of the container and to be connected to the rim of said opening in at least two points of attachment; and a protective dielectric cover covering said emitting area, wherein said dielectric cover has an extension larger than said opening in order to extend over the rim of said opening;

wherein the means for holding the array antenna comprises a support arranged on the backside of the array antenna for improving the pressure resistance, said support comprising a plate-like member of a rigid material and having an extension that is larger than said opening in order to extend over the rim of said opening, whereby the plate-like member takes up outwardly directed forces acting on the antenna device; and wherein said protective dielectric cover in the vicinity of said opening is at least partly arranged between the container wall and the plate-like member.

2. The antenna device of claim 1, wherein the protective dielectric cover has a mean thickness of essentially a fourth of the wavelength ($\lambda/4$) of the signals emitted from the array antenna.

3. The antenna device of claim 1 or 2, wherein the surface of said protective dielectric cover arranged to face the interior of the container is at least locally inclined in relation to the essentially flat array antenna.

4. The antenna device of claim 3, wherein the surface of said protective dielectric cover arranged to face the interior of the container comprises a plurality of areas with different inclination.

5. The antenna device of claim 1, adapted to be mounted in a non-horizontal position and wherein the array antenna is controllable to provide a maximum radiation direction which is essentially vertical.

6. The antenna device of claim 5, wherein the array antenna is a printed circuit board (PCB) with a metallic layer with radiating elements on the side towards the cover and a power distributing network on the other side including phase differences to create an antenna lobe allowing a vertical radiation.

7. The antenna device of claim 6, wherein the array antenna further include at least one second PCB with provisions for changing the phase difference by differencing the pattern on the second PCB in relation to the first PCB.

8. The antenna device of claim 7, wherein the second PCB is mountable in different ways, the different positions providing different directions of the antenna lobe.

9. The antenna device of claim 7, wherein the pattern is arranged to give two polarizations to separate the transmitter and receiver antenna functions.

10. The antenna device of claim 1, wherein the protective dielectric cover is integrated with the array antenna.

11. The antenna device of claim 1, wherein the protective dielectric cover comprises a window of a material chosen from the group: polytetrafluoroethylene (PTFE), polyphenylene sulfides (PPS) and polyether ether ketones (PEEK).

12. The antenna device of claim 1, wherein the protective dielectric cover is made of a homogeneous material.

13. The antenna device of claim 1, wherein the protective dielectric cover has an extension large enough to extend past said points of attachment.

14. An antenna device for use in a radar level gauging system for determining the filling level of a filling material in a container, comprising:
- an essentially flat array antenna with an emitting area for emitting measuring signals towards the surface of the filling material;
- means for holding the array antenna over an opening of the container and to be connected to the rim of said opening in at least two points of attachment; and
- a protective dielectric cover covering said emitting area, wherein said dielectric cover has an extension larger than said opening in order to extend over the rim of said opening, and wherein the protective dielectric cover is integrated with the array antenna, so that essentially no enclosed air space is left between the array antenna and the dielectric cover;
- wherein the means for holding the array antenna comprises a support arranged on the backside of the array antenna for improving the pressure resistance, said support comprising a plate-like member of a rigid material and having an extension that is larger than said opening in order to extend over the rim of said opening, whereby the plate-like member takes up outwardly directed forces acting on the antenna device; and
- wherein said protective dielectric cover in the vicinity of said opening is at least partly arranged between the container wall and the plate-like member.

15. An antenna device for use in a radar level gauging system for determining the filling level of a filling material in a container, comprising:
- an essentially flat array antenna with an emitting area for emitting measuring signals towards the surface of the filling material;
- means for holding the array antenna over an opening of the container and to be connected to the rim of said opening in at least two points of attachment; and
- a protective dielectric cover covering said emitting area, wherein said dielectric cover has an extension larger than said opening in order to extend over the rim of said opening, and wherein the protective dielectric cover is integrated with the array antenna, so that the dielectric cover is supported by the array antenna over at least most of its extension;
- wherein the means for holding the array antenna comprises a support arranged on the backside of the array antenna for improving the pressure resistance, said support comprising a plate-like member of a rigid material and having an extension that is larger than said opening in order to extend over the rim of said opening, whereby the plate-like member takes up outwardly directed forces acting on the antenna device; and
- wherein said protective dielectric cover in the vicinity of said opening is at least partly arranged between the container wall and the plate-like member.

16. An antenna device for use in a radar level gauging system for determining the filling level of a filling material in a container, comprising:
- an essentially flat array antenna with an emitting area for emitting measuring signals towards the surface of the filling material;
- a plate-like member of a rigid material arranged on the backside of the array antenna, and arranged to hold the array antenna over an opening in the wall of the container and to be connected to the rim of said opening, wherein said plate-like member has an extension larger than said opening in order to extend over the rim of said opening, whereby the plate-like member takes up outwardly directed forces acting on the antenna device; and
- a protective dielectric cover covering said emitting area, wherein said dielectric cover has an extension larger than said opening in order to extend over the rim of said opening, wherein said protective dielectric cover in the vicinity of said opening is at least partly arranged between the container wall and the plate-like member.

17. The antenna device of claim 16, wherein the protective dielectric cover has a mean thickness of essentially a fourth of the wavelength ($\lambda/4$) of the signals emitted from the array antenna.

18. The antenna device of claim 16, wherein the surface of said protective dielectric cover arranged to face the interior of the container is at least locally inclined in relation to the essentially flat array antenna.

19. The antenna device of claim 16, wherein the array antenna is a printed circuit board (PCB) with a metallic layer with radiating elements on the side towards the cover and a power distributing network on the other side including phase differences to create an antenna lobe allowing a vertical radiation.

20. The antenna device of claim 16, wherein the protective dielectric cover is integrated with the array antenna.

21. The antenna device of claim 16, wherein the protective dielectric cover has an extension large enough to extend past said points of attachment.

* * * * *

UNITED STATES PATENT AND TRADEMARK OFFICE
CERTIFICATE OF CORRECTION

PATENT NO. : 7,173,436 B2
APPLICATION NO. : 10/997683
DATED : February 6, 2007
INVENTOR(S) : Olov Edvardsson It is certified that error appears in the above-identified patent and that said Letters Patent is hereby corrected as shown below:

<u>Title Page,</u>
Item [73] delete "SAAB Rosemount Tank Radar AG, Gothenburg (SE)" and insert --SAAB Rosemount Tank Radar AB, Goteborg (SE) -- .

<u>Column 8,</u>
Line 23 delete "areas" and insert --area -- .

Signed and Sealed this

Seventh Day of August, 2007

JON W. DUDAS
*Director of the United States Patent and Trademark Office*